Patented Mar. 28, 1950

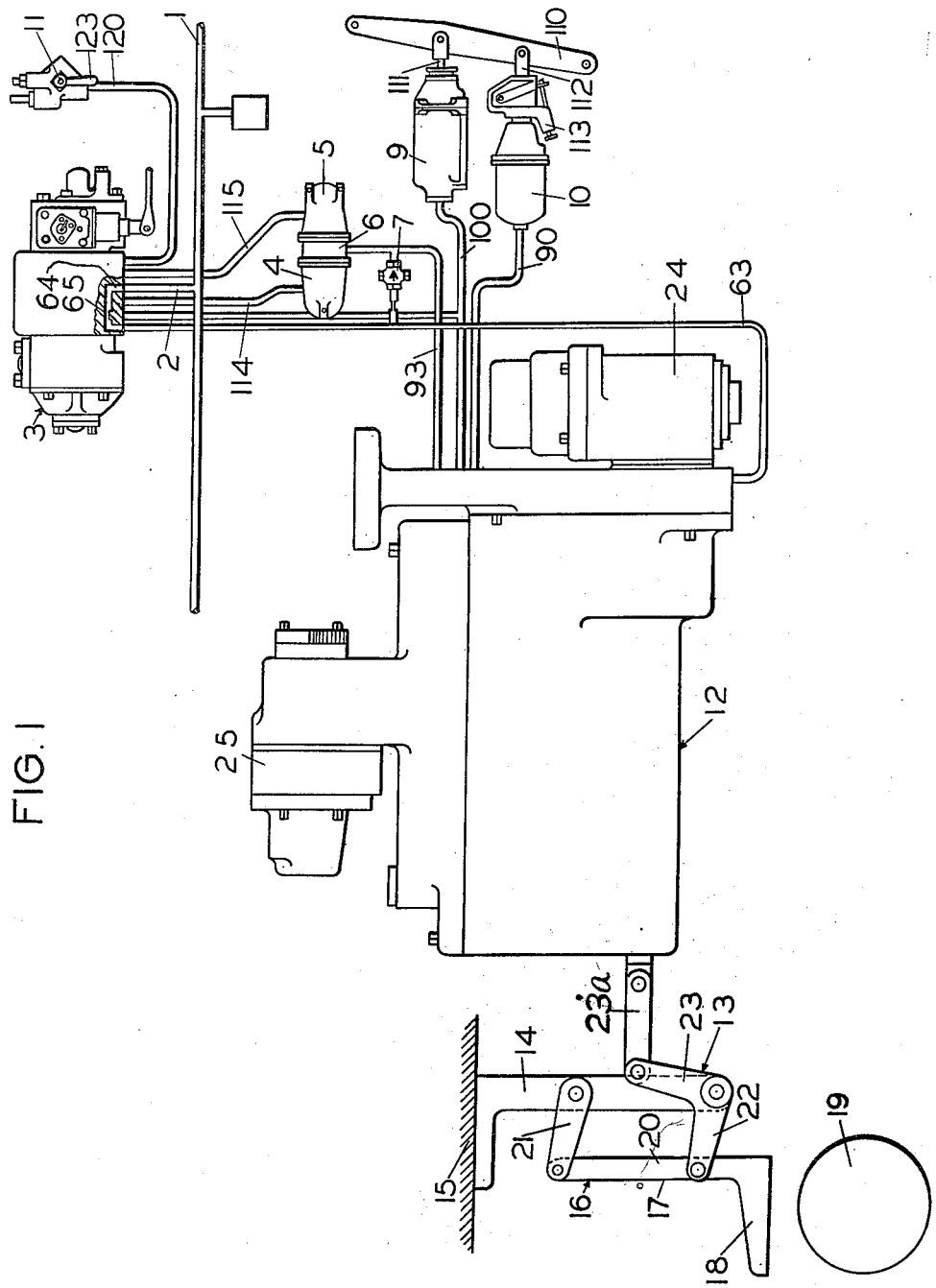

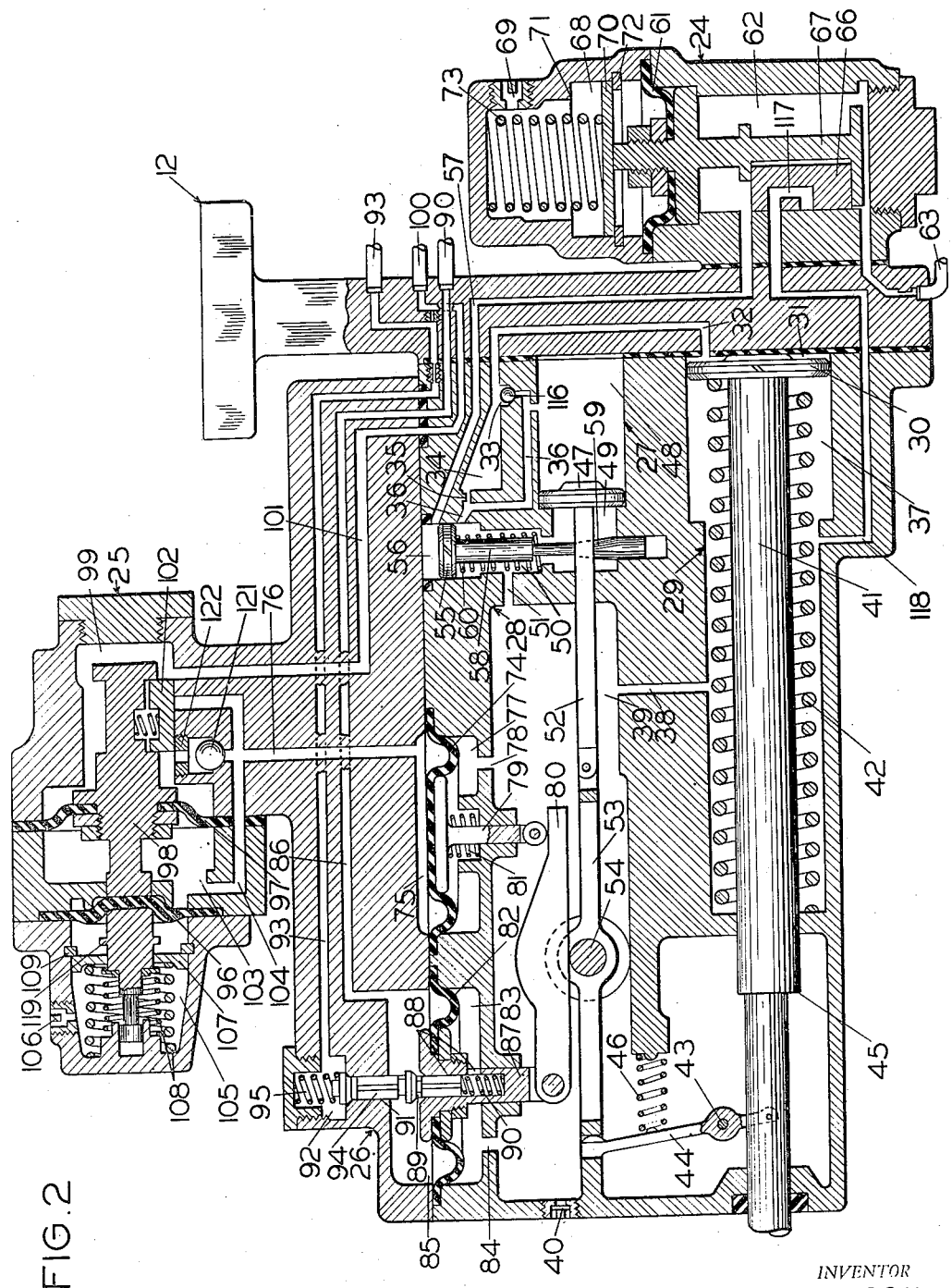

2,501,713

UNITED STATES PATENT OFFICE 2,501,713

VARIABLE LOAD BRAKE MECHANISM

Earle S. Cook, Forest Hills, Pa., assignor to The Westinghouse Air Brake Company, Wilmerding, Pa., a corporation of Pennsylvania Application March 29, 1946, Serial No. 658,030

12 Claims. (Cl. 303—22)

1

This invention relates to variable load brake equipment for vehicles, and more particularly to that type of equipment which is constructed and arranged to be automatically adjusted or conditioned to vary the braking forces according to the position that the vehicle body, under various loads, assumes relative to a fixed part of a truck.

The present trend towards the use of light weight materials in the construction of railway freight cars has resulted in much higher ratios of gross weight to tare weight than ever before encountered. Since the braking force in relation to the weight of an empty car must be such as to avoid wheel sliding and excessive train shock, the braking force on lighter weight cars will consequently have to be lower than heretofore. Because the gross weight is limited only by the load limit for the truck, which remains unchanged, the lower braking force will be inadequate for proper control of such cars when loaded.

The principal object of this invention, therefore, is to provide a variable load brake equipment which will operate in conjunction with the present type of fluid pressure brake equipment so that the braking forces will be sufficiently low on an empty car to prevent wheel sliding and will be increased in relation to any increase in the gross weight of the car so that a loaded or partially loaded car may be properly controlled in a train.

Another object is to provide a variable load brake equipment which will maintain substantially the proper ratio between the reduction in brake pipe pressure and the braking force obtained per pound reduction in brake pipe pressure.

Another object is to provide a variable load brake equipment which will operate in conjunction with the standard fluid pressure brake equipment to obtain the present application and release time intervals on a car without altering the flow capacities of any passages in the present standard freight brake equipment, including the usual retaining valve.

Another object is to provide in a variable load brake, which includes an adjustable member and a mechanism for locking the member in its adjusted position, a means for biasing said member in a certain direction, which means is effective only during the adjusting period so that strain on the locking mechanism will be eliminated at all other times.

The objects set forth above are attained by the use of an apparatus mounted entirely on the body of the car, which apparatus is responsive to the

2 pressure of fluid from the brake pipe below a certain degree of pressure to first adjust itself against the car axle and then to position a movable fulcrum for a scale beam in a load compensating valve device according to the adjustment, the fulcrum having previously been biased toward its fully loaded position by means responsive to the aforesaid fluid pressure. In subsequent brake applications the load compensating valve device is operative in response to the pressure of fluid in the brake cylinder pipe of the standard fluid pressure freight brake equipment to control passages, separate from those of the standard brake equipment, through which fluid from an independent reservoir may be supplied to and released from an additional brake cylinder at pressures in proportion to the standard brake cylinder pressure, which proportion has been determined by the position of the movable fulcrum in said device.

Other objects and advantages will become apparent in the following more detailed description of the invention taken in connection with the accompanying drawings wherein Fig. 1 is a diagrammatic view in outline of a railway freight brake equipment which includes a load compensating device embodying the invention, and Fig. 2 is a diagrammatic view in section of the load compensating valve device shown in Fig. 1.

As shown in Fig. 1, the variable load, or load compensating fluid pressure brake equipment may comprise the usual brake pipe 1, a branch pipe 2, a brake controlling valve device 3, an auxiliary reservoir 4, an emergency reservoir 5, a load reservoir 6, a check valve device 7, a brake cylinder device 9, which may be of the standard type, a load compensating brake cylinder device 10, a retaining valve device 11, a load compensating valve device 12, and a load measuring mechanism 13.

The brake controlling valve device 3 shown is of the "AB" type but may be of any other desired type. This device may be of substantially the same construction and have the same operating characteristic as the "AB" valve device fully described in the patent to Clyde C. Farmer, No. 2,031,213, issued February 18, 1936, and assigned to the assignee of the present invention, and in view of this it is deemed unnecessary to show and describe this device in detail. It will, of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes and the charging of the brake equipment.

The load measuring mechanism 13 may be of any desired construction, but for illustrative purposes is shown as comprising a bracket 14 which may be mounted by any suitable means to the lower surface of a railway car center sill 15, of which only the bottom cover plate is shown. Operatively mounted on this bracket 14 is a linkage 16 comprising a measuring element 17 having a horizontal portion 18, preferably disposed above the central portion of an axle 19 and parallel to the bottom of the center sill 15.

The linkage 16 further comprises a pair of vertically spaced links 21 and 22, the link 21 having one end pivotally connected to the upper end of the measuring element 17 and having the other end pivotally connected to the bracket 14. One end of the other link 22 is pivotally connected to the lower end of the depending portion 20 and the other end is pivotally connected to the lower end of the bracket 14. Formed integrally with the link 22 is an arm 23 which at its outer end makes an operative connection by means of a link 23a with the load compensating valve device 12, the link 22 and arm 23 serving as a bell crank in the operative connection between the load compensating valve device 12 and the measuring element 17.

The variable load or load compensating valve device 12, the operation of which is determined by the degree of movement of the measuring element 17, comprises (Fig. 2) a cut-off valve portion 24, a pilot valve portion 25, a relay valve portion 26, a fulcrum positioning portion 27, a locking portion 28, and a load measuring portion 29.

The load measuring portion 29 comprises a casing having operatively mounted therein a piston 30 having at one side a chamber 31 which is in open communication with the locking portion 28 by way of a passage 32, a chamber 33, a chamber 34, a choke 35, and a passage 36. At the other side of the piston 30 is a chamber 37 which is in constant open communication with the atmosphere by way of a passage 38, a chamber 39, and a passage 40. The piston 30 is provided with a stem 41 which extends through the chamber 37 and a portion of the chamber 39 and an opening in the wall of the casing and is pivotally connected with the link 24 for operating the load measuring mechanism 13. Interposed between and operatively engaging a wall of the casing and the piston 31 is a spring 42 which tends to move the piston 30 towards the position in which it is shown in Fig. 2. Rockably mounted intermediate its ends to a wall of the casing by means of a pin 43 is a lever 44 which is so located that its lower end may be engaged by a shoulder 45 of the stem 41 when measuring the load on a less than fully loaded car or vehicle. Interposed between the lever 44 and a portion of the casing is a spring 46 which exerts a pressure on the lever 44 to rock said lever about the pin 43 in a counter-clockwise direction toward the position in which it is shown.

The fulcrum positioning portion 27 comprises a casing having slidably mounted therein a piston 47 having at one side a chamber 48 which is in open communication with the locking portion 28 by way of a passage 36. At the other side of the piston 47 is a chamber 49 which is constantly open to atmosphere by way of a chamber 50 and a passage 51 in the locking portion 28, chamber 39 and the passage 40. The piston 47 is provided with a stem 52 which extends through the chamber 49 and a suitable opening in the casing into the chamber 39 and is there operatively connected with one end of a thrust member 53. This member is arranged so as to engage the upper end of the lever 44 and to position an adjustable fulcrum roller 54, which is rotatably mounted in said member and rolls upon a portion of the casing to various positions.

The locking portion 28 is provided for the purpose of locking the stem 52 of the piston 47 and thereby the fulcrum roller 54 in an adjusted position. Upon movement to an unlocked position, the locking portion 28 also operates to permit fluid under pressure to flow from the cut-off valve device 24 to the load measuring portion 29 and to the portion positioning portion 27 to render the same operative. The locking portion 28 comprises a casing having slidably mounted therein a piston 55 at one side of which is a chamber 56 which is in constant open communication with the cut-off valve device 24 by way of a passage 57 and at the other side of which is the chamber 50. The piston 55 is provided with a stem 58 which extends downwardly through the chamber 50 into the chamber 49, terminating in a cylindrical portion guided in a suitable bore in the casing. The stem 58 traverses the chamber 49 in a plane at right angles to a horizontal plane through the axis of the stem 52 as viewed in Fig. 2, that portion of the stem 58 within the chamber 49 being reduced in diameter for part of its length and increasing in diameter toward its lower end, so as to present an inclined or wedge surface 59 for engaging and locking the stem 52 in one position of the stem 58. A spring 60 is operatively mounted in the chamber 50 so as to tend to move the piston 55 in an upward direction and thus carry the surface 59 into locking engagement with the stem 52.

The cut-off valve portion 24 is provided for the purpose of controlling the supply of fluid under pressure from the brake pipe 1 to the load measuring portion 29 and the fulcrum positioning portion 27 by way of the locking portion 28. The cut-off valve portion 24 comprises a casing having mounted therein a flexible diaphragm 61 rigidly clamped around its periphery between two connected parts of the casing, and having at one side a valve chamber 62 which is in constant open communication with brake pipe 2 by way of a connected passage and pipe 63 and a brake pipe passage 64 provided in the brake controlling valve device 3, which passage 64 is provided with a choke 65. Slidably mounted in the chamber 62 is a slide valve 66 which is arranged to be operated by a notched stem or follower 67 operatively secured to the flexible diaphragm 61. As shown in Fig. 2, the slide valve 66 controls a communication by way of passage 57 between the chamber 62 in the cut-off valve portion and the chamber 56 in the locking portion 28.

At the other side of the diaphragm 61 is a chamber 68 which is constantly open to atmosphere by way of a passage 69. Slidably mounted in the chamber 68 is a stop member 70 which is arranged to abut either a shoulder 71 formed in the wall of the chamber to limit the upward movement of the member or a ring 72 expanded into an annular groove in said wall to limit the downward movement of said member. Interposed between and operatively engaging the member 70 and the top wall of the chamber 68 is a spring 73 which, at all times, tends to move the stop member in a downward direction.

The relay valve portion 26 comprises a casing having operatively mounted therein a flexible diaphragm 74 at one side of which there is a pressure chamber 75 which is in constant communication with the pilot valve portion 25 by way of a passage 76. At the other side of the diaphragm 74 is a chamber 77 which is constantly open to atmosphere by way of a passage 78, chamber 39 and passage 40. A stem and follower 79 is slidably mounted in a bore in the casing so that the lower end may bear upon one end of a scale beam lever 80 adapted to rock upon the fulcrum roller 54 in the chamber 39 while the other end extends through the chamber 77 to abut the diaphragm 74 and transmit force exerted by the diaphragm to the scale beam lever. A compression spring 81 is interposed between the bottom surface of the chamber 77 and the upper end of the follower 79 for the purpose of delaying the operation of the diaphragm 74 until a desired fluid pressure of approximately 4 pounds is obtained in the chamber for reasons hereinafter explained.

The relay valve portion 26 further comprises a flexible diaphragm 82 which is similar to diaphragm 74 and which is similarly mounted in the casing. At one side of this diaphragm 82 there is a chamber 83 which is in constant communication with the atmosphere by way of a passage 84, chamber 39 and passage 40. At the other side of the diaphragm 82 is a chamber 85 which is in constant open communication with the load brake cylinder device 10 by way of a passage and pipe 86. Contained in the chamber 83 is a diaphragm follower and stem 87 which is arranged to abut the diaphragm 82. This stem extends through a suitable opening in the wall of the casing into the chamber 39 and at its end is pivotally connected with the opposite end of the fulcrum lever 80, so that the diaphragm 82 may counterbalance the diaphragm 74. The follower 87 is provided with a bore and passage 88 by way of which communication may be established between the chamber 83 at the lower side of the diaphragm 82 and the chamber 85 at the upper side of the diaphragm 82. Operatively mounted in this bore 88 for controlling the communication between the chambers 83 and 85 is a valve 89, which valve is biased towards its open position by means of a spring 90 operatively mounted in the bore 88.

The chamber 85 is connected by way of a bore 91 to a valve chamber 92 which is in constant open communication with the load reservoir 6 by way of a passage and pipe 93. A valve 94 is operatively mounted in the bore 91 for controlling communication between the chamber 85 and chamber 92 and is normally held in its seated position by a spring 95 operatively mounted in the chamber 92. As shown in the Fig. 2 the lower end of the valve 94 rests upon the upper end of the valve 89.

The pilot valve portion 25 comprises two spaced and axially aligned flexible diaphragms 96 and 97 each of which is rigidly clamped at its outer periphery between two connected parts of the casing and at its inner periphery to a stem 98. At the right-hand side of the diaphragm 97 is a valve chamber 99 which is in constant open communication by way of a passage 101 and a pipe 100 with the brake cylinder device 9, and contained in this chamber is a slide valve 102 to be operated by a notched portion of the stem 98. Between the diaphragms 96 and 97 is a chamber 103 which is in constant open communication by way of the passages 104 and 76 with chamber 75 in the relay valve mechanism 26 and may, as will hereinafter appear, be supplied with fluid under pressure from chamber 99 by way of the passage 104. At the left-hand side of the diaphragm 96 is a chamber 105 which is open to atmosphere by way of a passage 106. Contained in this chamber 105 and interposed between the left-hand wall of said chamber and an annular spring seat 107, mounted on the stem 98, is a pair of concentric springs 108 which tends to move this spring seat toward the right into engagement with a stop ring 109 expanded into an annular groove in the casing.

The brake cylinder devices 9 and 10 are operatively connected to a brake cylinder lever 110 by means of push rods 111 and 112, respectively, the load compensating brake cylinder device 10 being provided with a latch mechanism 113 which is attached to the piston of the brake cylinder device 10 and through which the usual push rod 112 is free to move relative to said piston and piston rod when said piston and piston rod are in release position. The brake cylinder device 10 is arranged so that when the piston and piston rod thereof are moved outwardly under the influence of the pressure of fluid supplied thereto, the latch mechanism 113 will engage the push rod 112 and thereby will act on the brake cylinder lever 110 to add the force of brake cylinder device 10 to that applied to the lever by the brake cylinder device 9. While the brake cylinder device 9 may be any of the standard brake cylinders now used in fluid pressure brake equipment, it should be understood that the ratio of the lever or levers operated thereby will be such as to provide the braking forces desired for braking empty cars.

OPERATION

*Initial charging of the equipment*

Assuming the vehicle embodying the invention to be fully loaded and separated from a train, brakes on the vehicle released, the brake pipe 1 on the vehicle to be depleted of fluid under pressure and the fulcrum roller 54 of the load compensating valve mechanism 12 to be temporarily disposed in the load position in which it is shown, the brake controlling valve device 3 will be in brake applied position and the several other parts of the equipment will be in the positions in which they are shown.

Now if the loaded vehicle is placed in a train, the brake pipe 1 will of course, be connected at each end of the vehicle to the corresponding brake pipe at the adjacent end of each adjacent vehicle in the train and as a result will be charged with fluid under pressure in the usual manner. Fluid under pressure thus supplied to the brake pipe 1 flows through the branch pipe 2 to the chambers at the faces of the service and emergency pistons of the brake controlling valve device 3, moving them in due course to release and charging position. Fluid under pressure will then flow to the several chambers of the brake controlling valve device 3, and thence in the usual manner, to the auxiliary reservoir 4 by way of a pipe 114 and to the emergency reservoir 5 by way of a pipe 115. At the same time fluid under pressure will flow from the brake pipe 1 to the load reservoir 6 by way of branch pipe 2, passage 64, choke 65, pipe 63, check valve 7, and pipe 93. Fluid under pressure in pipe 63 will also flow first to the cut-off valve device chamber 62 and then by way of passage 57 to chamber 56 in the locking portion 28. Upon an increase in the pressure of fluid in this chamber 56 to a predetermined value, piston 55 is caused to move downwardly against the opposing pressure of the spring 60, thereby moving the wedge surface 59 of the stem 58 out of locking engagement with the stem 52, thus releasing the stem 52 and the member 53 for movement by the lever 44.

The piston 55 as it moves downwardly passes the mouth of the passage 36, thereby establishing communication between the chamber 56 of the locking portion and chamber 48 of the fulcrum positioning portion 27 and also chamber 31 in the load measuring portion 29. Fluid under pressure in chamber 56 will then flow by way of passage 36 to chamber 48, in response to which the piston 47 will be urged toward the position in which it is shown and if not already in this position will be moved thereto due to previous release of the wedge surface 59 on stem 58 from the stem 52. Fluid under pressure from chamber 56 will also flow by way of passage 36, past a check valve 116 into chamber 33, and thence by way of passage 32 to chamber 31 in the load measuring portion 29. In response to the pressure of fluid thus supplied to chamber 31, piston 30 will move to the left against the opposing pressure of the spring 42, exerting through the medium of the stem 41 and link 24 a force on the lever 23 in the direction of the left-hand as viewed in the drawing. This force will cause the arm 23 and the link 22 to rock in a counter-clockwise direction, thereby causing the measuring element 17 to be moved downwardly until the measuring portion 18 engages the axle 19.

With the vehicle loaded, the position of the measuring portion 18 relative to the axle 19 will be as shown in the drawing and in this position movement of the piston 30 the measuring portion will be arrested by the engagement of the bottom surface of portion 18 with the axle 19 before the shoulder 45 of the stem 41 advances into engagement with the lower end of the lever 44. Consequently no movement will be imparted to the member 53 and the fulcrum roller 54 will therefore remain in the position in which it is illustrated, that is to say, in a position for braking a fully loaded vehicle.

Now when the pressure of fluid in the valve chamber 62 of the cut-off valve portion 24 has increased to approximately 30 pounds per square inch, the diaphragm 61 will be caused to deflect upwardly against the opposing pressure of the spring 73, thereby moving the slide valve 66 to an uppermost position in which position the passage 57 is connected by way of a cavity 117 in the slide valve to a passage 118. With this connection thus established, fluid under pressure in piston chamber 56 of the locking portion 28 will be vented to atmosphere by way of passage 57, cavity 117, passage 118, chamber 37, passage 38, chamber 39 and passage 40. Also, fluid under pressure will flow from chamber 31 of the load measuring portion 29 through passage 32, chamber 33, passage and chamber 34, choke 35, and passage 36 to chamber 56. Since the passage 36 is restricted by the choke 35, and there is additional fluid under pressure stored in the chamber 34, the fluid pressure in chamber 31 will reduce much more slowly than that in chamber 56.

When the pressure of fluid in the chamber 56 is slightly less than that of the spring 60, said spring will act to shift the piston 55 upwardly, bringing the surface 59 of the stem 58 in the locking portion 28 into locking engagement with the stem 52. With the piston 55 in its uppermost position, passage 36 is connected to atmospheric chamber 50. Fluid under pressure now flows from chamber 31 by way of passage 32, chamber 33, chamber 34, choke 35, passage 36, to chamber 50 and thence by way of passage 51, chamber 39 and passage 40 to atmosphere. Likewise fluid under pressure in chamber 48 will flow to atmosphere by way of passage 36 and the same route just described. When the pressure of fluid acting on the piston 31 is slightly less than the opposing pressure of the spring 42, said spring will cause the piston 30, the stem 41 and the lever 23 to return to the positions in which they are shown. By this action the load measuring apparatus 13 is retracted to the position in which it is shown.

From the preceding paragraph it will be observed that the locking portion 28 is always operated to lock the stem 52 which acts through the medium of the member 53 to position the fulcrum roller 54 in its newly adjusted position, before the measuring apparatus 13 is retracted from the axle. It will also be noted from the preceding paragraph that after the stem 52 is locked, chamber 48 is vented to atmosphere, thereby eliminating the biasing force exerted by the piston 47, and therefore the strain on the locked piston stems 52 and 58 caused thereby.

With the chambers 56 and 31 thus vented of fluid under pressure, the lock controlling piston 55, load measuring piston 30, and the load measuring mechanism 13, which has been displaced, are now returned to the positions in which they are shown, and the cut-off valve device 24 being maintained by fluid at brake pipe pressure in the position to which it was previously moved, the equipment is now conditioned for braking a fully loaded vehicle.

*Application of the brakes on a fully loaded vehicle*

When it is desired to effect an application of the brakes, the brake pipe pressure is reduced in the usual manner, causing the brake controlling valve device 3 to function to supply fluid under pressure from auxiliary reservoir 4 to the brake cylinder device 9 in order to advance the usual brake shoes, not shown, into frictional engagement with the vehicle wheels. The flow of fluid under pressure from auxiliary reservoir 4 to the brake cylinder device 9 is effected by way of a pipe 114, through the brake controlling valve device 3 and brake cylinder pipe 100. At the same time, fluid under pressure flows through pipe and passage 100 to chamber 99 in the pilot valve portion 25, by reason of which the diaphragm 97 will be caused to flex, moving the stem 98 to the left as viewed in the drawing, until a shoulder 119 engages the spring seat 107, whereupon further movement of the diaphragm 97 will be resisted by the springs 108 acting through said spring seat. When the stem 98 is moved to a position in which its movement is resisted by the springs 108, the slide valve 98 will still be in a position to cut off the flow of fluid from the chamber 99 to the passage 104.

Upon the further increase in the pressure of the fluid in the chamber 99 to approximately 15 pounds, which pressure is the same as that supplied to the brake cylinder device 9, the diaphragm 97 will be moved against the opposing pressure of the springs 108, causing the slide valve 102 to uncover the passage 104, so that fluid may now flow from the chamber 99 to the chamber 103 on the opposite side of the diaphragm 97 and also to the chamber 75 above the diaphragm 74 in the relay valve portion 26 of the load compensating valve device 12.

Upon the supply of fluid under pressure to the chamber 103, the power of the diaphragm 97 to overcome the pressure of the spring 108 is diminished and continues to diminish as the fluid pressure in chamber 103 increases, up to a certain degree to be explained later. The pressure of fluid in chamber 103 also acts on the diaphragm 96 to decrease the effective force transmitted from the springs 108 to the stem 98, for it will be understood that this spring force will still be sufficient to cause the stem 98 to shift the slide valve 102 to the right and cut off the further flow of fluid from the chamber 99 to passage 104 and chamber 103 when the pressure in chamber 103 has reached a predetermined degree in relation to the pressure in the chamber 99. It is preferred that the relation of the diaphragm areas and the spring force be such that at approximately 50 pounds pressure (equalization point between the brake cylinder and auxiliary reservoir pressures) the diaphragm 97 will be ineffective, and in response to this pressure diaphragm 96 will be effective to maintain the stem 98 and slide valve 102 in their extreme left-hand position. Thus the 15-pound difference in the pressure of fluid in the chamber 99 over that in the chamber 103 is decreased in proportion to the degree of increase in the brake application until at a full service application (50 pounds brake cylinder pressure) the pressures in these chambers are equal.

With the vehicle fully loaded, the fulcrum 54 will be in the position in which it is shown in the drawing, in which position the relay valve portion 26 will operate to supply fluid under pressure from the reservoir 6 to the load compensating brake cylinder device 10 in a manner now to be described. The pressure of fluid supplied to the chamber 75 tends to deflect the diaphragm 74 and the follower 79 downwardly against the opposing pressure of the spring 81. When the fluid pressure in chamber 75 is sufficient to overcome the spring pressure (about 4 pounds per square inch) the follower and stem 79 will be caused to move downwardly, thereby rocking the scale beam lever 80 in a clockwise direction about the fulcrum roller 54. As the lever is thus rocking it acts through the medium of the stem 87 to cause said stem and attached diaphragm 82 to move upwardly. It is intended that the spring 95 be of greater strength than the spring 90 so that upon upward movement of the stem and follower 87, the valves 89 and 94 will remain stationary while the follower 87 moves into seating engagement with the valve 89 against the pressure of the spring 90. Further upward movement of the follower 87 will cause the follower to act through the medium of the exhaust valve 89 and supply valve 94 to raise and unseat the supply valve against the opposing pressure of the spring 95. With the supply valve unseated, fluid under pressure supplied from the reservoir 6 to the chamber 92 by way of the pipe and passage 93 flows from the chamber 92, past the fluted stem of the valve 94, through the diaphragm chamber 85, passage 86 and pipe 90 to the load compensating brake cylinder device 10.

Now when the pressure of fluid in the diaphragm chamber 85, acting on the diaphragm 82, together with the pressure of the springs 81 and 95 becomes slightly greater than that required to balance the force of diaphragm 74 acting through the lever 80, the diaphragm 82 will deflect downwardly, permitting the supply valve 94 to seat, the valve as it is thus closed cutting off further flow of fluid under pressure to the diaphragm chamber 85 and consequently to the brake cylinder device 10. With the flow of fluid to the chamber 85 cut off, the downward flexure of the diaphragm 82 ceases and the lever 80 comes to a stop before the diaphragm follower 87 unseats the exhaust valve 89.

When in effecting an application of the brakes on a fully loaded vehicle, fluid under pressure is supplied to the brake cylinder device 9, said device functions to actuate the brake cylinder lever 110 to first cause the slack in the brake rigging to be taken up and then to cause the push rod 112 of the load brake cylinder device 9 to be moved outwardly relative to its associated piston rod and piston. At approximately 15 pounds pressure in the brake cylinder device 9 the slack in the brake rigging will have been taken up and fluid under pressure is supplied from the load reservoir 6 to the load brake cylinder device 10. As the piston and piston rod of the device 10 move out under the influence of pressure supplied thereto, the latch mechanism 113 functions in the usual well known manner to latch the notched push rod 112, so that further movement of the piston of the load brake cylinder device 10 now acts, through the medium of the latch mechanism and push rod, on the brake cylinder lever 110 to add the force of the load brake cylinder device 10 to that of brake cylinder device 9.

*Release of the brakes on a fully loaded vehicle*

When it is desired to effect a release of the brakes, the brake pipe pressure is increased in the usual manner, causing the brake controlling valve device 3 to function to establish communication from the brake cylinder device 9 to atmosphere by way of the retaining valve device 11. Fluid under pressure now flows from the brake cylinder device 9 to the brake controlling valve device 3, and from there by way of a pipe 120 to the retaining valve device 11 which connects pipe 120 directly to atmosphere when a handle 123 on the device 11 is in the position in which it is shown. Brake cylinder device 9 now responds to the release of fluid under pressure in the usual manner to effect a release of the vehicle brakes. Upon the release of fluid under pressure from pipe and passage 100, fluid will also be released from the chamber 99 of the pilot valve device 25 by way of the passage and pipe 100, brake controlling valve device 3, pipe 120 and the retaining valve device 11 to atmosphere.

Upon release of fluid from chamber 99, diaphragm 97 will be moved to the position in which it is shown in the drawing by the pressure of fluid in the chamber 103, and thereafter fluid from the chamber 103 will flow to the chamber 99 by way of passage 104, past a ball check valve 121, and a passage 122. Fluid from chamber 75 of the relay valve portion 26 will also flow to the chamber 99 by way of passage 76, passage 104, past ball check 121 and passage 122.

When the pressure of fluid in the chamber 75 is decreased, the spring 81 and the pressure of fluid in the chamber 85 will cause the diaphragm 74 to move upwardly and thereby rock the lever 80 about the fulcrum roller 54 in a counterclockwise direction to retract the follower 87 from sealing engagement with release valve 89. With the release valve 89 unseated, fluid under pressure is vented from the brake cylinder device 10 to the atmosphere by way of the pipe 90, passage 86, release valve chamber 85, past the unseated valve 89 and its fluted stem, and bore and passage 88 to chamber 83, and thence to atmosphere by way of passage 84, chamber 39 and passage 40. When the pressure of fluid in chamber 85 has been reduced to an amount slightly below the opposing force of the diaphragm 74 acting through the medium of the lever 80 and the spring 81, the diaphragm 74 will act to rock the lever 80 in a clockwise direction about the fulcrum roller 54, again moving the member 87 into sealing engagement with the valve 89 and cutting off the further flow of fluid under pressure from the brake cylinder device 10 and chamber 85 to atmosphere. With the flow of fluid thus cut off, diaphragm 82 will promptly come to a stop without unseating the supply valve 94. A further reduction in the pressure of fluid in chamber 75 will cause the operation just described to be repeated until a full release of the brakes is effected.

Referring now to the pilot valve portion 25 of the load compensating valve device 12, it will be seen that the pressure of fluid in chambers 99 and 103 will be substantially equal when a full brake application is effected and that as the pressure of fluid in chamber 103 approaches a lesser value than that of the springs 108, diaphragm 96 will operate to actuate the stem 98 and thereby the valve 102 to the right as viewed in the drawing. However, the value of the spring 81 in chamber 77 of the relay valve portion 26 will be such that the release valve 89 will be unseated constantly in the low range below 15 pounds of fluid pressure in the brake cylinder device 9 and thus in the chamber 99 of the pilot valve portion 25.

*Automatic changeover operation of the equipment on a partially loaded vehicle*

Assuming now that the brakes on the vehicle are released and that the vehicle is separated from the train and that while the brake pipe is at atmospheric pressure, lading is removed from the body of the vehicle. In response to the reduction in weight thus effected, the vehicle body and consequently the center sill 15, will move upwardly relative to the axle 19 by reason of the usual truck spring (not shown) expanding in response to the reduction in weight.

Now when the vehicle is connected in a train, the brake pipe starts to charge with fluid under pressure in the same manner as hereinbefore described in connection with the charging of a loaded vehicle. As before described in connection with charging the equipment, fluid under pressure which is supplied to the brake pipe 1 flows to chamber 62 in the cut-off valve portion 24, whence it flows by way of passage 57 to chamber 56 in the locking portion 28. In response to the pressure of fluid in chamber 56, piston 55 will move downwardly against the pressure of the spring 60, thereby causing the wedge surface 59 of the stem 58 to move out of locking engagement with the stem 52 of the piston 47 disposed in the fulcrum positioning portion 27. When the piston 55 has moved a sufficient distance to effect the unlocking of the piston stem 52, it will have uncovered the mouth of the passage 36 so as to permit fluid under pressure to flow by way of passage 36, check valve 116, chamber 33, and passage 32 to chamber 31 in the load measuring portion 29. Fluid under pressure in passage 36 may also flow to chamber 48 in the fulcrum positioning portion 27 where it will act upon the piston 47 to urge it towards its extreme left-hand position in which it is shown in the drawing. In response to the pressure of fluid supplied to chamber 31, piston 30 will move to the left against the opposing pressure of the spring 42 to exert through the medium of the stem 41 and link 23a a force on the lever 23 in the direction of the left hand as viewed in the drawing. This force will cause the arm 23 and the link 22 to rock in a counterclockwise direction, thereby causing the measuring element 17 to be moved downwardly.

The space between the center sill 15 and the axle 19, and consequently between the portion 18 of the measuring element 17 and the axle 19, having been increased because of the extension of the springs as a result of the reduction of the weight of the load, the shoulder 45 of the piston stem 41 will engage the lower end of the lever 44 before the horizontal portion 18 of the measuring element 17 engages the axle 19 and rotate the lever 44 about the stem 43 in a clockwise direction against the pressure of the spring 46 and the pressure of fluid acting on the piston 47. It will be understood that the relative areas of pistons 31 and 55 will be such that pressure of fluid acting upon the piston 31 will permit the piston 31 to prevail over the opposing pressures of fluid in chamber 48 acting on piston 47, and of spring 46 and of spring 42. Piston 31, therefore, will act through the medium of the lever 44 and the thrust member 53 and the stem 52 to shift the piston 47 toward the right until this action is arrested by the engagement of the measuring portion 18 with the axle 19. This movement of the thrust member 55 will of course cause the fulcrum roller 54 to be shifted to some position intermediate the position in which it is shown in the drawing and its extreme right-hand position which will be the corresponding position for braking a partially loaded vehicle.

Now when the pressure of fluid in the valve chamber 62 of the cut-off valve device 24 has increased to approximately 30 pounds, the diaphragm 61 will be caused to deflect upwardly thereby moving the slide valve 66 to its uppermost position, in which position the passage 57 will be connected by way of cavity 117 to passage 118. With this connection thus established, fluid under pressure in piston chamber 56 of the locking portion 28 will be vented to atmosphere by way of the passage 57, cavity 117, passage 118, chamber 37, passage 38, chamber 39, and passage 40. Also, fluid under pressure will flow from chamber 31 of the load measuring portion 29 through passage 32, chamber 33, passage and chamber 34, choke 35, and passage 36 to chamber 56. Since the passage 36 is restricted by the choke 35, and there is additional fluid under pressure stored in the chamber 34, the fluid pressure in chamber 56 will reduce much more rapidly than in chamber 31.

When the pressure of fluid in the chamber 56 is slightly less than that of the spring 60, said spring will act to shift the piston 55 upwardly, bringing the surface 59 of the stem 58 in the locking portion 28 into locking engagement with the stem 52. With the piston 55 in its uppermost position, passage 36 is connected to atmospheric chamber 50. Fluid under pressure now flows from chamber 31 by way of passage 32, chamber 33, chamber 34, choke 35, passage 36, to chamber 50 and thence by way of passage 51, chamber 39 and passage 40 to atmosphere. Likewise fluid under pressure in chamber 48 will flow to atmosphere by way of passage 36 and the same route just described. When the pressure of fluid acting on the piston 31 is slightly less than the opposing pressure of the spring 42, said spring will cause the piston 30, the stem 41 and the lever 23 to return to the positions in which they are shown. This action will cause the shoulder 45 of the stem 41 to be withdrawn from the lower end of the lever 44 and thereby permit the spring 46 to act to rock the lever 44 in a counterclockwise direction to the position in which it is shown in the drawing.

By this action it will be seen that the fulcrum roleir 54 will be locked in some position to the right of that in which it is shown and the other parts of the load compensating valve device 12 will be returned to the positions in which they are shown in the drawing and the equipment will be conditioned for braking a partially loaded vehicle.

*Application of the brakes on a partially loaded vehicle*

When an application of the brakes is made on a partially loaded vehicle by effecting a reduction in brake pipe pressure, the operation of the brake controlling valve device 3 will be identical with the operation described for a loaded vehicle. From this it will be understood that fluid under pressure will be supplied through pipe 100 to the brake cylinder device 9, from pipe 100 to chamber 99 in the pilot valve portion 25 by way of passage 101, and then upon operation of the pilot valve portion 25, to the chamber 75 in a relay valve portion 26 by way of a passage 76 in the manner previously described for the application of the brakes on a loaded vehicle.

The pressure of fluid in the chamber 75 tends to deflect the diaphragm 74 and the follower 79 downwardly against the opposing pressure of the spring 81. When the fluid pressure in said chamber is sufficient to overcome the pressure of spring 81, together with the pressure of spring 95 the follower and stem 79 will be caused to move downwardly, thereby rocking the scale beam lever 80 in a clockwise direction about the fulcrum roller 54. As the lever is thus rocking it acts through the medium of the stem 87 to cause said stem and attached diaphragm 82 to move upwardly. Upon upward movement of the stem and follower 87, the valves 89 and 94 will remain stationary while the follower 87 moves into seating engagement with the valve 89 against the pressure of the spring 90. Further upward movement of the follower 87 will cause the follower to act through the exhaust valve 89 and the stem of the supply valve 94 to unseat the supply valve against the opposing pressure of the spring 95. With the supply valve thus unseated, fluid under pressure supplied from the reservoir 6 to the chamber 92 by way of the pipe and passage 93 flows from the chamber 92 past the fluted stem of the valve 94, through the diaphragm chamber 95, passage 86 and pipe 98 to the load compensating brake cylinder device 10.

Now when the pressure of fluid in the diaphragm chamber 85, acting on the diaphragm 82, together with the pressure of the springs 90 and 95 become slightly greater than that required to balance the force of diaphragm 74 acting through the scale beam lever 80 the diaphragm 82 will deflect downwardly permitting the spring 95 to move the supply valve 94 to its seat, the valve as it is thus closed cutting off further flow of fluid under pressure to the diaphragm chamber 85 and consequently to the brake cylinder device 10. With the flow of fluid to the chamber 85 cut off, the downward flexure of the diaphragm 82 will cease and the lever 80 comes to a stop before the follower 87 disengages the valve 89 so that the release valve will remain seated. It should be understood that, with the fulcrum roller 54 disposed to the right of the position in which it is shown in the drawing, a lower degree of fluid pressure in chamber 85 acting on the diaphragm 82 will be sufficient to balance the force of the diaphragm 74. Consequently, the pressure of fluid in the connected brake cylinder device 10 will be correspondingly less for a partially loaded vehicle.

When, in effecting an application of the brakes on a partially loaded vehicle, fluid under pressure is supplied to the brake cylinder device 9, this device functions to actuate the brake cylinder lever 110 to first cause the slack in the brake rigging to be taken up and then to cause the push rod 112 of the load compensating brake cylinder device 10 to be moved outwardly relative to its associated piston rod and piston. At approximately 15 pounds pressure in the brake cylinder device 10, the slack in the brake rigging will have been taken up and fluid under pressure is then supplied from the load reservoir 6 to the load compensating brake cylinder device 10. As the piston and piston rod of the device 10 move out under the influence of the pressure of fluid supplied thereto, the latch mechanism 113 functions in the usual well known manner to latch the notched push rod 112, so that further movement of the load brake cylinder device 10 now acts, through the medium of the latch mechanism and push rod, on a brake cylinder lever 110 to add the force of the load brake cylinder device 10 to that of the brake cylinder device 9.

*Release of the brakes with the equipment conditioned for braking a partially loaded vehicle*

When it is desired to effect a release of the brakes on a partially loaded vehicle, a brake controlling valve device 3 will function in response to an increase in brake pipe pressure to vent fluid under pressure from the brake cylinder device 9 to atmosphere by way of pipe 100, controlling valve device 3, pipe 120, and an atmospheric passage in the retaining valve device 11 and cause the brake cylinder device 9 to respond in the usual manner to effect a release of the brakes.

Since chamber 99 in the pilot valve portion 25 is connected to the passage and pipe 100, the resulting reduction in the pressure of fluid in chamber 99 will effect the reduction of fluid pressure in the chamber 75 of the relay valve portion 26 in the same manner as previously described for the release of brakes with the equipment conditioned for a loaded vehicle.

It will be understood, however, that the pilot valve portion 25 operates to cut off the direct flow of fluid under pressure from passage 104 to chamber 99 and, fluid will be released more rapidly from the brake cylinder device 10 than it is released from a brake cylinder device 9, so that the possibility of damage to the latch mechanism 113 associated with the brake cylinder device 10 is eliminated.

From the foregoing it will be seen that as the weight of the load on the vehicle becomes less the fulcrum roller 54 assumes a position further to the right until when conditioned for braking an empty vehicle the roller will be positioned directly beneath the follower and stem 79. In this position of the roller the diaphragm 15 is prevented from deflecting in a downward direction. Consequently, on an empty vehicle, the relay valve mechanism 26 is rendered inoperative and no fluid under pressure is supplied from the load reservoir 6 to the load compensating brake cylinder device 10. The brake cylinder device 9 only is now operative to provide the force for braking the empty vehicle.

Summary

It will thus be seen that by the use of this invention there is provided a variable load fluid pressure brake mechanism carried wholly on the car body, which mechanism is automatically adjusted or conditioned to vary a supply of fluid under pressure from a supplementary reservoir to a supplementary or load brake cylinder device and thereby vary the braking forces according to the position that the vehicle body, under various loads assumes relative to a vertically fixed part of a truck. This mechanism will operate in conjunction with the standard AB freight brake equipment without necessitating any changes therein. The invention also provides, in a variable load brake of the type having an adjustable member and a mechanism for locking the member in its adjusted position, a fluid pressure responsive means biasing said member in a certain direction, which means is effective only during the adjusting period so that strain on the locking mechanism will be eliminated at all other times.

Having now described my invention, what I claim as new and desire to secure by Letters Patent is:

1. The combination with a vehicle having a sprung part and an unsprung part, said sprung part being movable vertically relative to said unsprung part distances varying according to different loads carried by the sprung part, and a fluid pressure brake equipment conditionable according to the distance the sprung part moves vertically relative to the unsprung part for operation to provide the braking power called for by the load carried of a variable leverage relay valve mechanism carried by said sprung part and comprising a member adjustable for conditioning the fluid pressure brake equipment, one means responsive to fluid pressure to bias said member toward a fully loaded position, a measuring mechanism operable for ascertaining the degree of vertical movement of said sprung part relative to said unsprung part, and another means responsive to fluid pressure to operate said measuring mechanism and to overcome the biasing force exerted by said one means so as to adjust said member in accordance with the operation of said measuring mechanism.

2. The combination with a vehicle having a sprung part and an unsprung part, said sprung part being movable vertically relative to said unsprung part distances varying according to different loads carried by the sprung part, and a fluid pressure brake equipment conditionable according to the distance the sprung part moves vertically relative to the unsprung part for operation to provide the braking power called for by the load carried, of a variable leverage relay valve mechanism carried by said sprung part and comprising a member adjustable for conditioning the fluid pressure brake equipment, one means responsive to fluid pressure to bias said member toward a fully loaded position, a measuring mechanism carried by one of the aforementioned vehicle parts and including a measuring element movable relative to one of the aforementioned vehicle parts into engagement with the other of the aforementioned vehicle parts for ascertaining the degree of vertical movement of said sprung part relative to said unsprung part, another means responsive to fluid pressure to actuate said measuring element and to overcome the biasing force exerted by said one means so as to adjust said member according to the degree of movement of said element relative to the part on which it is carried, and means for admitting fluid under pressure to both said one means and said other means.

3. The combination with a vehicle having a sprung part and an unsprung part, said sprung part being movable vertically relative to said unsprung part distances varying according to different loads carried by the sprung part, and a fluid pressure brake equipment conditionable according to the distance the sprung part moves vertically relative to the unsprung part for operation to provide the braking power called for by the load carried, of a variable leverage relay valve mechanism carried by said sprung part and comprising a member adjustable for conditioning the fluid pressure brake equipment, one means responsive to fluid pressure to bias said member toward a fully loaded position, a measuring mechanism carried by one of the aforementioned vehicle parts and including a measuring element movable relative to one of the aforementioned vehicle parts into engagement with the other of the aforementioned vehicle parts for ascertaining the degree of vertical movement of said sprung part relative to said unsprung part, another means responsive to fluid pressure to operate said measuring element and to adjust said one means out of said certain position to a position corresponding to the degree of movement of said measuring element relative to the part on which it is carried, and means for admitting fluid under pressure to both said one means and said other means.

4. The combination with a vehicle having a sprung part and an unsprung part, said sprung part being movable vertically relative to said unsprung part distances varying according to different loads carried by the sprung part, and a fluid pressure brake equipment conditionable according to the distance the sprung part moves vertically relative to the unsprung part for operation to provide the braking power called for by the load carried, of a variable leverage relay valve mechanism carried by said sprung part and comprising a member adjustable for conditioning the fluid pressure brake equipment, one means responsive to fluid pressure to bias said member toward a fully loaded position, a measuring mechanism carried by a sprung part of the vehicle and including a measuring element movable relative to the sprung part into engagement with the unsprung part for ascertaining the degree of vertical movement of the sprung part relative to the unsprung part, and another means responsive to fluid pressure to operate said measuring element and to adjust said member against the opposing biasing force of said one means out of said certain position to a position corresponding to the degree of movement of said measuring element.

5. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, of a mechanism carried by said sprung part and adapted to cooperate with said unsprung part for conditioning said fluid pressure brake equipment, said mechanism comprising a member cooperating with said fluid pressure brake equipment and being movable to condition the fluid pressure brake equipment, a measuring element carried by said sprung part adapted to be moved into engagement with said unsprung part, a fluid pressure responsive means operable to bias said member toward its fully loaded position, and a second fluid pressure responsive means operative, after the first mentioned means operates, to actuate said element into engagement with said unsprung part and when the vehicle is less than fully loaded to move said member out of said fully loaded position in opposition to the first mentioned means a distance corresponding to the degree of movement of said measuring element.

6. The combination with a vehicle having a sprung part and an unsprung part, said sprung part being movable vertically relative to said unsprung part distances varying according to different loads carried by the sprung part, and a fluid pressure brake equipment carried by said sprung part and conditionable according to the distance the sprung part moves vertically relative to the unsprung part for operation to provide the braking power called for by the load carried, a brake pipe being included in said fluid pressure brake equipment and being normally charged with fluid under pressure, of a mechanism carried by said sprung part and adapted to cooperate with said fluid pressure brake equipment for conditioning the equipment, said mechanism comprising a member cooperating with said fluid pressure brake equipment and being adjustable to condition the equipment, locking means for normally retaining said member in any position to which it may be adjusted, a measuring mechanism carried by said sprung part and including a measuring element movable relative to said sprung part into and out of engagement with the unsprung part, a fluid pressure responsive means operative to bias said member toward its fully loaded position, a second fluid pressure means operative, after the first mentioned means operates, to actuate said element into engagement with said unsprung part and to move said member in opposition to the first mentioned means a distance corresponding to the degree of movement of said measuring element, and means responsive to a low brake pipe pressure in initially charging the brake pipe for first unlocking said member and then admitting fluid under pressure to both fluid pressure responsive means.

7. A load compensating brake mechanism for a vehicle having a sprung body part and an unsprung truck part, said mechanism being wholly carried by said sprung body part and comprising a member adjustable for varying the vehicle braking force according to the position to which said member is adjusted, a measuring element carried by said sprung body part and movable into engagement with said unsprung truck part for determining the position to which said member is to be adjusted, one fluid pressure responsive means for biasing said member toward a fully loaded position, another fluid pressure responsive means for actuating said measuring element and also said member from said fully loaded position to an adjusted position, and means for simultaneously supplying fluid under pressure to both fluid pressure responsive means.

8. A load compensating brake mechanism for a vehicle having a sprung body part and an unsprung truck part, said mechanism being wholly carried by said sprung body part and comprising a member adjustable for varying the vehicle braking force according to the position to which said member is adjusted, a measuring element carried by said sprung body part and movable into engagement with said unsprung truck part for determining the position to which said member should be adjusted, one fluid pressure responsive means for biasing said member toward a certain position, another fluid pressure responsive means for actuating said measuring element and also said member from said certain position to an adjusted position, a locking means for locking said member in its adjusted position, means operative to render said locking means ineffective prior to the movement of said member and to render said locking means effective at all other times, and means associated with said locking means for supplying fluid under pressure to both fluid pressure responsive means after said locking means has been rendered ineffective.

9. A load compensating brake mechanism for a vehicle having a sprung body part and an unsprung truck part, said mechanism being wholly carried by said sprung body part and comprising a member adjustable for varying the vehicle braking force according to the position to which said member is adjusted, a measuring element carried by said sprung body part and movable into engagement with said unsprung truck part for determining the position to which said member should be adjusted, one fluid pressure responsive means for biasing said member toward a certain position, another fluid pressure responsive means for moving said measuring element into engagement with said unsprung truck part and adjusting said member against the bias of said one fluid pressure responsive means, fluid pressure controlled means for locking said member in its adjusted position, means associated with said locking means for supplying fluid under pressure to both fluid pressure responsive means after said locking means is unlocked, and spring means for delaying the operation of the second fluid pressure responsive means until said bias has been effected.

10. A load compensating brake mechanism for a vehicle having a sprung body part and an unsprung truck part, said mechanism being wholly carried by said sprung body part and comprising a member adjustable for varying the vehicle braking force according to the position to which said member is adjusted, a measuring element carried by said sprung body part and movable into engagement with said unsprung truck part for determining the position to which said member should be adjusted, one fluid pressure responsive means for biasing said member toward a fully loaded position, another fluid pressure responsive means for actuating said measuring element and also said member from said certain position to an adjusted position, and means for supplying fluid under pressure to both fluid pressure responsive means, said other fluid pressure responsive means being capable of opposing and overpowering said one fluid pressure responsive means.

11. A load compensating brake mechanism for a vehicle having a sprung body part and an unsprung truck part, said mechanism comprising a member adjustable for varying the vehicle braking force according to the position to which said member is adjusted, a measuring element carried by said sprung body part and movable into engagement with said unsprung truck part for determining the position to which said member should be adjusted, one fluid pressure responsive means for biasing said member toward a certain position, another fluid pressure responsive means for moving said measuring element into engagement with said unsprung truck part and adjusting said member against the bias of said one fluid pressure responsive means, means for supplying fluid under pressure to both fluid pressure responsive means simultaneously, and spring means for delaying the operation of the second fluid pressure responsive means until said bias has been effected.

12. A load compensating brake mechanism for a vehicle having a sprung body part and an unsprung truck part, said mechanism comprising a member adjustable for varying the vehicle braking force according to the position to which said member is adjusted, a measuring element carried by said sprung body part and movable into engagement with said unsprung truck part for determining the position to which said member should be adjusted, one fluid pressure responsive means for biasing said member toward a fully loaded position, another fluid pressure responsive means for moving said measuring element into engagement with said unsprung truck part and adjusting said member against the bias of said one fluid pressure responsive means, and means for supplying fluid under pressure to both fluid pressure responsive means simultaneously.

EARLE S. COOK.

REFERENCES CITED

The following references are of record in the file of this patent:

UNITED STATES PATENTS

| Number | Name | Date |
|---|---|---|
| 2,390,049 | Baldwin | Dec. 4, 1945 |